US008363643B2

(12) United States Patent
Kim et al.

(10) Patent No.: US 8,363,643 B2
(45) Date of Patent: Jan. 29, 2013

(54) METHOD FOR DELIVERING DEVICE AND SERVER CAPABILITIES

(75) Inventors: Youngae Kim, Mississauga (CA); Andrew Allen, Mundelein, IL (US)

(73) Assignee: Research In Motion Limited, Waterloo, Ontario (CA)

( * ) Notice: Subject to any disclaimer, the term of this patent is extended or adjusted under 35 U.S.C. 154(b) by 871 days.

(21) Appl. No.: 12/490,095

(22) Filed: Jun. 23, 2009

(65) Prior Publication Data

US 2009/0316690 A1 Dec. 24, 2009

Related U.S. Application Data

(60) Provisional application No. 61/074,934, filed on Jun. 23, 2008.

(51) Int. Cl.
*H04L 12/66* (2006.01)
(52) U.S. Cl. ........................................ 370/352
(58) Field of Classification Search ........................ None
See application file for complete search history.

(56) References Cited

U.S. PATENT DOCUMENTS

| | | | | |
|---|---|---|---|---|
| 7,564,846 B2* | 7/2009 | Dezonno et al. | ............... | 370/392 |
| 2004/0243680 A1 | 12/2004 | Mayer | | |
| 2005/0050194 A1* | 3/2005 | Honeisen et al. | ............... | 709/224 |
| 2005/0193133 A1 | 9/2005 | Niemi et al. | | |
| 2006/0045067 A1* | 3/2006 | Dezonno et al. | ............... | 370/352 |
| 2006/0047840 A1* | 3/2006 | Postmus | ............... | 709/230 |
| 2006/0179115 A1* | 8/2006 | Garcia-Martin et al. | ..... | 709/217 |
| 2006/0239247 A1* | 10/2006 | Postmus | ............... | 370/352 |
| 2007/0043872 A1* | 2/2007 | Pattan et al. | ............... | 709/227 |
| 2007/0260739 A1* | 11/2007 | Buckley et al. | ............... | 709/230 |
| 2009/0010247 A1* | 1/2009 | Stille | ............... | 370/352 |
| 2011/0103372 A1* | 5/2011 | Shatsky et al. | ............... | 370/352 |
| 2011/0103373 A1* | 5/2011 | Shatsky et al. | ............... | 370/352 |

FOREIGN PATENT DOCUMENTS

WO 2006117323 A1 11/2006

OTHER PUBLICATIONS

Troost et al., "Communication Presentation Information in Internet Messages: The Content-Disposition Header Field", RFC 2183, Aug. 1997, Network Working Group, All Pages.*
Burger, "A Mechanism for Content Indirection in Session Initiation Protocol (SIP) Messages", RFC 4483, May 2006, Network Working Group, All Pages.*
PCT International Preliminary Report on Patentability; PCT Application No. PCT/US2009/048285; Oct. 6, 2010; 7 pgs.
3GPP TS 23.218 V8.2.0; 3rd Generation Partnership Project; Technical Specification Group Core Network; IP Multimedia (IM) Session Handling; IM Call Model; Stage 2 (Release 8); Jun. 2008; 63 pgs.
Open Mobile Alliance; Title: Client Using Invite to Initiate Push Delivery; Change Request; OMA-CD-PUSH-2008-0065-CR_Client_using_INVITE_to-Initiate_Push_Delivery; Jun. 11, 2008; 4 pgs.
Open Mobile Alliance; Title: Push Using SIP; OMA-TS-SIP_Push-V1_0-20080416-D; Draft Version 1.0; Apr. 16, 2008; 51 pgs.

(Continued)

*Primary Examiner* — Otis L Thompson, Jr.
(74) *Attorney, Agent, or Firm* — Research In Motion Limited; David R. Morris (57) ABSTRACT

A method is provided for delivering the capabilities of user agents. The method includes a user agent sending a session initiation protocol (SIP) message containing a Contact Header containing a Push Resource Identifier feature tag containing at least one push resource.

20 Claims, 3 Drawing Sheets

OTHER PUBLICATIONS

3GPP TS 24.229 v8.3.0; 3rd Generation Partnership Project; Technical Specification Group Core Network and Terminals; IP Multimedia Call Control Protocol Based on Session Initiation Protocol (SIP) and Session Description Protocol (SDP); Stage 3 (Release 8); Mar. 2008; 150 pgs. Part 1.

3GPP TS 24.229 v8.3.0; 3rd Generation Partnership Project; Technical Specification Group Core Network and Terminals; IP Multimedia Call Control Protocol Based on Session Initiation Protocol (SIP) and Session Description Protocol (SDP); Stage 3 (Release 8); Mar. 2008; 150 pgs. Part 2.

3GPP TS 24.229 v8.3.0; 3rd Generation Partnership Project; Technical Specification Group Core Network and Terminals; IP Multimedia Call Control Protocol Based on Session Initiation Protocol (SIP) and Session Description Protocol (SDP); Stage 3 (Release 8); Mar. 2008; 100 pgs. Part 3.

3GPP TS 24.229 v8.3.0; 3rd Generation Partnership Project; Technical Specification Group Core Network and Terminals; IP Multimedia Call Control Protocol Based on Session Initiation Protocol (SIP) and Session Description Protocol (SDP); Stage 3 (Release 8); Mar. 2008; 95 pgs. Part 4.

Rosenberg, J.; Title: Obtaining and Using Globally Routable User Agent (UA) URIs (GRUU) in the Session Initiation Protocol (SIP); draft-ietf-sip-gruu-15; SIP; Oct. 11, 2007; 45 pgs.

Kyzivat, P.; Title: Registration Event Package Extension for Session Initiation Protocol (SIP) Globally Routable User Agent URIs (GRUUs); draft-ietf-sipping-gruu-reg-event-09; Sipping; Jul. 6, 2007;18 pgs.

Rosenberg, J.; Title: A Session Initiation Protocol (SIP) Event Package for Registrations; Network Working Group; RFC 3680; Mar. 2004; 30 pgs.

Roach, A.B.; Title: Session Initiation Protocol (SIP)—Specific Event Notification; Network Working Group; RFC 3265; Jun. 2002; 43 pgs.

Rosenberg, J. et al.; Title: SIP: Session Initiation Protocol; Network Working Group; RFC 3261; Jun. 2002; 100 pgs. Part 1.

Rosenberg, J. et al.; Title: SIP: Session Initiation Protocol; Network Working Group; RFC 3261; Jun. 2002; 100 pgs. Part 2.

Rosenberg, J. et al.; Title: SIP: Session Initiation Protocol; Network Working Group; RFC 3261; Jun. 2002; 102 pgs. Part 3.

Allen, Andrew, et al.; U.S. Appl. No. 12/361,382, filed Jan. 28, 2009; Title: Providing Session Initiation Protocol Request Contents Method and System.

PCT International Search Report; PCT Application No. PCT/US2009/032270; Aug. 26, 2009; 4 pgs.

PCT Written Opinion of the International Searching Authority; PCT Application No. PCT/US2009/032270; Aug. 26, 2009; 7 pgs.

Research in Motion Limited; 3GPP TSG CTWG1 Meeting #53; Title: Enhancement of Filter Criteria for Third Party Registration and Other Requests; C1-081718; Capetown, South Africa; May 5-9, 2008; 8 pgs.

Krishnamoorthy, Srini, et al.; Title: IMS Enhanced Filter and Action Criteria; 2007 International Conference on; IEEE; Dec. 6, 2007; 3 pgs.

Sparks, R.; Title: Internet Media Type Message/Sipfrag; Network Working Group; RFC 3420; Nov. 2002; 9 pgs.

3GPP TSG CT WG1 Meeting #51; Change Request; C1-080382; Puerto Vallarta, Mexico; Jan. 28-Feb. 1, 2008; 3 pgs.

3GPP TSG CT WG1 Meeting #51; Timestamp in REGISTER Request; C1-080170; Puerto Vallarta, Mexico; Jan. 28-Feb. 1, 2008; 2 pgs.

3GPP TSG CT WG1 Meeting #51; Change Request; C1-080171; Puerto Vallarta, Mexico; Jan. 28-Feb. 1, 2008; 2 pgs.

3GPP TS 23.228 v8.5.0; 3rd Generation Partnership Project; Technical Specification Group Services and System Aspects; IP Multimedia Subsystem (IMS); Stage 2; Release 8; Jun. 2008; 240 pgs.

3GPP TS 29.228 v8.2.0; 3rd Generation Partnership Project; Technical Specification Group Core Network and Terminals; IP Multimedia (IM) Subsystem Cx and Dx Interfaces; Signalling Flows and Message Contents; Release 8; Jun. 2008; 65 pgs.

3GPP TS 29.229 v8.2.0; 3rd Generation Partnership Project; Technical Specification Group Core Network and Terminals; Cx and Dx Interfaces Based on the Diameter Protocol; Protocol Details; Release 8; Jun. 2008; 30 pgs.

PCT International Search Report; PCT Application No. PCT/US2009/048285; Jan. 27, 2010; 3 pgs.

PCT Written Opinion of the International Searching Authority; PCT Application No. PCT/US2009/048285; Jan. 27, 2010; 6 pgs.

* cited by examiner

METHOD FOR DELIVERING DEVICE AND SERVER CAPABILITIES

CROSS-REFERENCE TO RELATED APPLICATIONS

The present application claims priority to U.S. provisional patent application No. 61/074,934, filed Jun. 23, 2008, by Youngae Kim, et al, entitled "Method for Determining Device Capability", which is incorporated by reference herein as if reproduced in its entirety.

BACKGROUND

The IP (Internet Protocol) Multimedia Subsystem (IMS) is a standardized architecture for providing multimedia services and voice-over-IP calls to both mobile and fixed devices. The Session Initiation Protocol (SIP) been standardized and governed primarily by the Internet Engineering Task Force (IETF) as a signaling protocol for creating, modifying, and terminating IMS-based calls or sessions. As used herein, the terms "user agent" and "UA" might in some cases refer to mobile devices such as mobile telephones, personal digital assistants, handheld or laptop computers, and similar devices that have telecommunications capabilities. Such a UA might consist of a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as fixed line telephones, desktop computers, set-top boxes, or network nodes. When a network node acts as a UA, the network node could act on behalf of another function such as a mobile or fixed line device and simulate or emulate the device. For example, for some UAs, the IMS SIP client that would typically reside on the device can actually reside in the network as well and can relay SIP message information to the device using optimized protocols. In other words, some functions that were traditionally carried out by a UA can be distributed in the form of a remote UA, where the remote UA represents the UA in the network. The term "UA" can also refer to any hardware or software component that can terminate a communication session that could include, but is not limited to, a SIP session. Also, the terms "user agent", "UA", "user equipment", "UE", and "node" might be used synonymously herein.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Technology for communication systems is moving away from the telephony-based concept of only a single identity (e.g., a telephone number) uniquely mapping to only a single line or device. SIP and other internet-based communication technologies support the concept of having multiple devices registered with the same user identity (such as a Public User Identity or PUI). Each device may have its own capabilities, such as supporting different media types and codecs. SIP provides a way for one SIP UA to query and be notified of the capabilities of another UA (e.g., support for various media types including text and other types of messaging along with audio and video, all within the same session or multiple sessions).

These capabilities may eliminate the need for a user to have different identities for a home phone, personal mobile phone, work phone, vacation home phone, laptop computer VoIP client, fax machine, etc., and may allow the user to be reachable at whichever device the user may be using at the time. This can also resolve the issue of having a large list of device-oriented contacts per user in an address book and having to decide which device is best to reach the user when attempting to establish communication.

Often in IP- and SIP-based communications, network-based servers provide services and content to UAs (often termed clients). The Open Mobile Alliance (OMA) SIP Push Enabler is an example of a system where a network-based server, known as a Push Sender Agent, provides an efficient way to directly deliver contents to a SIP Push client, known as the Push Receiver Agent, without the SIP Push client needing to first request content from the SIP Push Sender Agent.

When SIP network-based servers are used, it may be necessary for a UA, such as a SIP Push Receiver Agent, to obtain the capabilities supported by a server, such as a SIP Push Sender Agent. The SIP OPTIONS method, as defined in the Internet Engineering Task Force (IETF) Request for Comments (RFC) 3261, can be used to query and obtain the capabilities of a server.

Similarly, a SIP network-based server, such as a SIP Push Sender Agent, may need to obtain the capabilities supported by a UA, such as a SIP Push Receiver Agent. Again, the SIP OPTIONS method can be used to query and obtain the capabilities of a UA. The SIP 200 OK response to the SIP OPTIONS request can include a body containing information about the capabilities of the UA. This information may be in addition to the capability information specified in IETF RFC 3261 to be transported in the SIP headers of the 200 OK response to the SIP OPTIONS request. This body could contain either capability information such as an OMA UA Profile document or a Uniform Resource Identifier (URI) or similar identifier that points to the document containing capability information such as the OMA UA Profile document.

Since a UA may not be available (due to, for example, power off and power on or to the loss and regaining of wireless coverage in the case of wireless devices), the UA may need to register with the system. The server might need to discover that a UA has become available and may do so through one or more mechanisms. In one mechanism, the server could determine whether the UA is available by receiving a SIP OPTIONS request from the UA. In another mechanism, the server could subscribe to the Registration Event package and receive a notification (SIP NOTIFY request), as defined in IETF RFC 3680, indicating that the UA has registered. In another mechanism, the server could receive a SIP REGISTER request known as a third party registration, as defined in 3rd Generation Partnership Project (3GPP) Technical Specification (TS) 23.218 and 3GPP TS 24.229, indicating that the UA has registered.

Once the server has detected that the UA has registered, the server might query the UA for its capabilities using a SIP OPTIONS request. In the case of the OMA SIP Push Enabler, the server may obtain the OMA UA Profile document for the UA. However, there may be an issue if there are multiple UAs registered for the same user, since a SIP OPTIONS request is normally addressed to the registered Address of Record (AoR) or PUI of the user. In such a case, it may not be possible to determine which of the registered UAs will receive the SIP OPTIONS request from the server and return its capabilities.

Since SIP OPTIONS requests are not forked according to IETF RFC 3261, the server may need to ensure that a SIP OPTIONS request is routed to the UA that the server just discovered had registered. A SIP OPTIONS request does not establish a dialog, so even if the server determines that the UA is available through receiving a SIP OPTIONS request from the UA, the server may not be able to send a SIP OPTIONS request back using a SIP dialog. Returning a SIP OPTIONS request using a SIP dialog could ensure that the SIP OPTIONS request reached the UA that sent the original SIP OPTIONS request. Thus, when a SIP Push Sender Agent sends a SIP Push client (Push Receiver Agent) a SIP OPTIONS request using a PUI or AoR associated with multiple UAs used by the same user, it may not be clear which of the UAs the request will be sent to.

In an embodiment, a server, such as a Push Sender Agent, uses a GRUU (Globally Routable UA URI) to address a SIP OPTIONS request to a UA, such as a Push Receiver Agent. A GRUU is a URI that identifies both a UA and its associated PUI or AoR. A GRUU can be obtained by a UA during the registration process as specified in the IETF document [draft-ietf-sip-gruu]. In order to send the SIP OPTIONS request to the correct UA, the server, such as the Push Sender Agent, may need to obtain the GRUU of the UA that it has discovered has registered.

In an embodiment, there may be three ways for the SIP Push Sender Agent to discover the public GRUU: via the SIP OPTIONS method; via the SIP SUBSCRIBE/NOTIFY mechanism described in IETF RFC 3265, using the registration event package described in IETF RFC 3680 and the extension defined in the IETF document [draft-ietf-sipping-gruu-reg-events]; or using a third party registration mechanism that contains a body containing the contents of the original SIP REGISTER request. Each of these mechanisms will be described in detail below. When the SIP Push Sender Agent determines the public GRUU value of the SIP Push Receiver Agent, the SIP Push Sender Agent sends a SIP OPTIONS request with a Request-URI portion that contains the public GRUU of the SIP Push Receiver Agent. Upon receiving this request, the SIP Push Receiver Agent includes the URI of its UAProfile in the body of a SIP 200 OK message (or alternatively includes the UAProfile document directly in the body). The SIP Push Receiver Agent then sends the SIP 200 OK to the SIP Push Sender Agent, thus providing its capabilities to the SIP Push Sender Agent.

In an embodiment, a UA (or Push Receiver Agent) sends a server (or Push Sender Agent) a SIP OPTIONS request that includes the GRUU of the Push Receiver Agent. The GRUU might be included in the Contact header of the SIP OPTIONS request. The Push Sender Agent then sends the Push Receiver Agent a 200 OK message containing information about the Push Sender Agent's capabilities. The Push Sender Agent then requests the capabilities of the Push Receiver Agent by sending a SIP OPTIONS request to the GRUU that the Push Receiver Agent provided in the previous SIP OPTIONS request. The Push Receiver Agent can then return a 200 OK message containing information about the Push Receiver Agent's capabilities. In some cases, the 200 OK message contains capability information of the Push Receiver Agent such as the Push Receiver Agent's OMA UA Profile document, and in other cases, the 200 OK message contains a URI that points to capability information of the Push Receiver Agent such as the Push Receiver Agent's OMA UA Profile document.

Alternatively, the Push Sender Agent might include its capabilities in a 200 OK response to a SIP OPTIONS request from the Push Receiver Agent but might not send a SIP OPTIONS request to the Push Receiver Agent's GRUU to request the Push Receiver Agent's capabilities.

Examples of procedures that may be used at the Push Receiver Agent and the Push Sender Agent under these embodiments are provided below.

Procedures at the Push Receiver Agent

When generating a SIP OPTIONS request according to [RFC 3261] the Push Receiver Agent:
1. SHALL generate a SIP OPTIONS request.
2. SHALL set the Request-URI of the SIP OPTIONS request to the URI of the Push Sender Agent.
3. MAY insert the URI of the Push Receiver Agent in the P-Preferred-Identity header according to rules and procedures of [RFC 3325].
4. SHALL if the Push Receiver Agent obtained a public GRUU during registration according to the rules and procedures of [draft-ietf-sip-gruu] include the public GRUU in the Contact header.
5. SHALL include the Push Resource Identifier feature tag containing the values of all the push resource's supported by the Push Receiver Agent in the Contact header as defined in section 9.1.
6. SHALL if the Push Receiver Agent obtained a public GRUU during registration according to the rules and procedures of [draft-ietf-sip-gruu] insert gruu in the Supported header.
7. SHALL include an Accept header containing the MIME types, message/external-body and application/oma_PushOptions as specified in [RFC 4483].
8. SHALL include all the SIP methods that the Push Receiver Agent supports in the Allow header.
9. SHALL include a User-Agent header containing the model, vendor, and version of the Push Receiver Agent.
10. SHALL send the SIP OPTIONS request towards the SIP/IP Core according to the procedures of the SIP/IP Core.

Upon receiving the SIP 200 "OK" response to the SIP OPTIONS request the Push Receiver Agent:
1. SHALL provide the Push Capabilities of the Push Sender Agent included in the Contact header according to [RFC3840] to the Push Applications.
2. SHALL provide the SIP methods supported by the Push Sender Agent included in the Allow header to the Push Applications.
3. SHALL if the SIP 200 "OK" response contains a body retrieve the body and process according to the Content-Disposition.

Upon receiving a SIP OPTIONS request containing an Accept header containing the MIME types, message/external-body and application/Dev-cap, the Push Receiver Agent:
1. SHALL verify that a P-Asserted-Identity header is present and the URI in P-Asserted-Identity header is trusted. If the authorization check fails, the Push Receiver Agent SHALL return a SIP 403 "Forbidden" response.
2. SHALL generate a SIP 200 "OK" response according to [RFC3261].
3. SHALL if the Push Receiver Agent obtained a public GRUU during registration according to the rules and procedures of [draft-ietf-sip-gruu] include the public GRUU in the Contact header.
4. SHALL include all the SIP methods that the Push Receiver Agent supports in the Allow header.
5. SHALL if the Push Receiver Agent obtained a public GRUU during registration according to rules and procedures of [draft-ieff-sip-gruu] insert gruu in the Supported header.
6. SHALL include the Push Resource Identifier feature tag containing the values of all the push resource's supported by the Push Receiver Agent in the Contact header.
7. SHALL include a User-Agent header containing the model, vendor, and version of the Push Receiver Agent.
8. SHALL according to the rules and procedures of [RFC 4483]. include a Content-Type header containing:
   a. the MIME type message/external-body,
   b. "URL" in the ACCESS_TYPE parameter,
   c. the HTTP URL of the [OMA_UAProf] document in the URL parameter.
9. SHALL include a body according to the rules and procedures of [RFC 4483]. containing:
   a. application/Dev-cap in the Content-Type,
   b. "attachment" in the Content-Disposition,
   c. A Content-ID according to the rules and procedures of [RFC 4483].
10. SHALL send the SIP 200 "OK" response towards the SIP/IP Core according to the procedures of the SIP/IP Core.

Procedures at the Push Sender Agent

Upon receiving a SIP OPTIONS request the Push Sender Agent:
1. SHALL verify that a P-Asserted-Identity header is present and the URI in P-Asserted-identity header is trusted. If the authorization check fails, the Push Sender Agent SHALL return a SIP 403 "Forbidden" response.
2. SHALL generate a SIP 200 "OK" response according to [RFC3261].
3. SHALL include a Push Resource Identifier feature tag containing the accepted push resource values in the Contact header.
4. SHALL include all the SIP methods that the Push Sender Agent supports in the Allow header.
5. SHALL send the SIP 200 "OK" response towards the SIP/IP Core according to the procedures of the SIP/IP Core.

The Push Sender Agent SHALL query for capabilities of the Push Receiver Agent and the Push Sender Agent:
1. SHALL generate a SIP OPTIONS request according to [RFC 3261].
2. SHALL set the Request-URI of the SIP OPTIONS request to the public user identity of the Push Receiver Agent from the P-Asserted-Identity in the received SIP OPTIONS request or the public GRUU if the public GRUU was received in the Contact header in the received SIP OPTIONS request.
3. MAY insert the URI of the Push Sender Agent in the P-Asserted-Identity header according to rules and procedures of [RFC 3325].
4. SHALL include a Push Resource Identifier feature tag containing the acceptable push resource values in the Contact header as defined in section 9.1.
5. SHALL include an Accept header containing the MIME types, message/external-body and application/Dev-cap as specified in [RFC 4483].
6. SHALL include all the SIP methods that the Push Sender Agent supports in the Allow header.
7. SHALL send the SIP OPTIONS request towards the SIP/IP Core according to the procedures of the SIP/IP Core.

Upon receiving the SIP 200 "OK" response to the SIP OPTIONS request the Push Sender Agent:
1. SHOULD if the SIP 200 "OK" contains a body containing a Content-Type of application/Dev-cap and a HTTP URL of a specified document, store the URL and retrieve the associated document according to the rules and procedures of [RFC 4483] to obtain the device capabilities.

Figure 1:
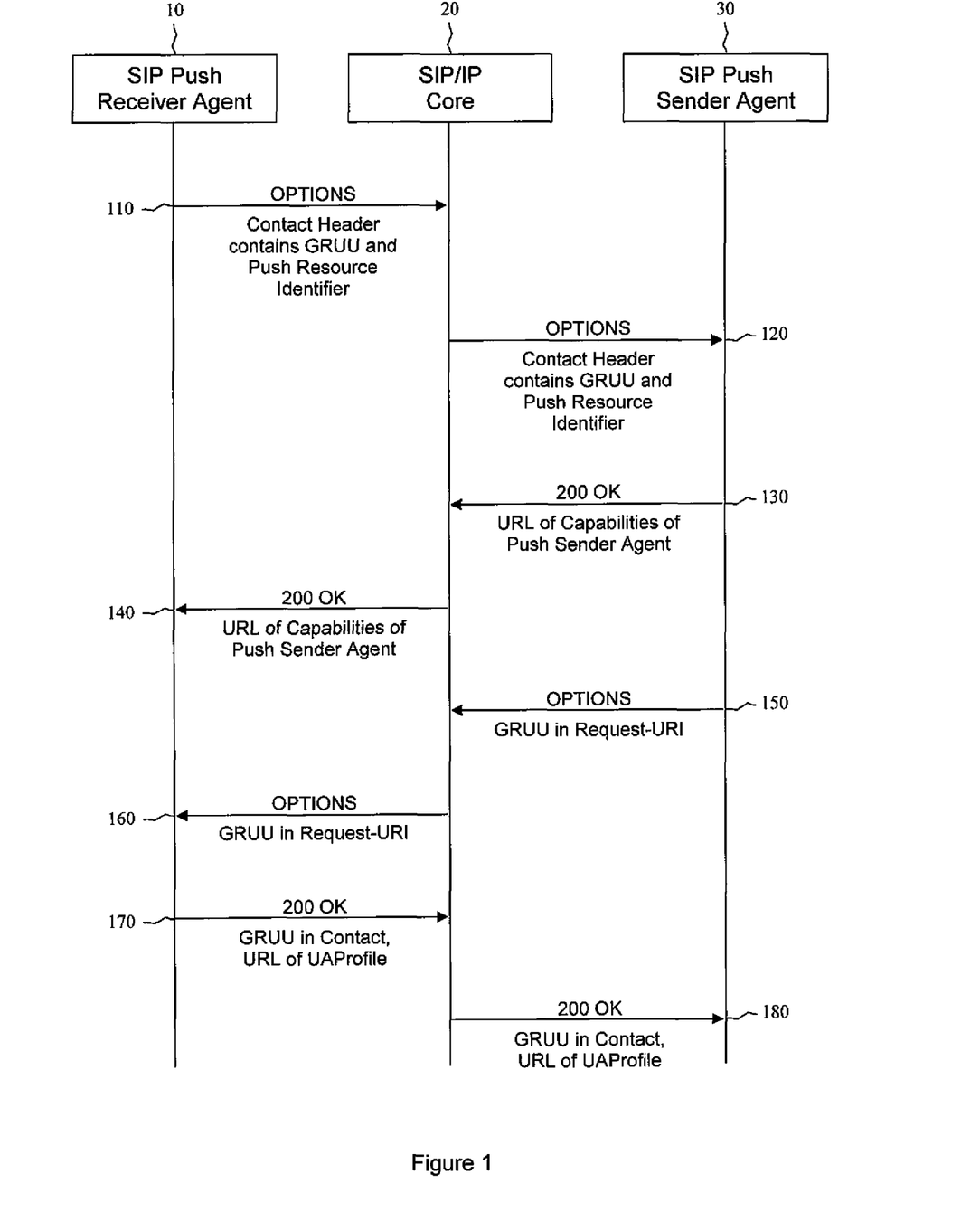
FIG. 1 is a message flow diagram according to an embodiment of the disclosure.

FIG. 1 depicts an example message flow between a SIP Push Receiver Agent 10, a SIP/IP Core 20, and a SIP PUSH Sender Agent 30 according to this embodiment. At event 110, the SIP Push Receiver Agent sends the SIP/IP Core a SIP OPTIONS request containing in the Contact header its public GRUU value, which it obtained during the registration process, along with the Push Resource Identifier feature tag (+g.oma.pusheventapp) containing the values of the push resources supported by the Push Receiver Agent. The following is an embodiment of this SIP OPTIONS request:

---

OPTIONS sip:pushserver@network.net SIP/2.0
Via: SIP/2.0/UDP pc33.atlanta.com;branch=z9hG4bKhjhs8ass877
Max-Forwards: 70
To: <sip:pushserver@network.net>
From: Alice <sip:alice@atlanta.com>;tag=1928301774
P-Preferred-Identity: "Alice" <sip:alice@atlanta.com>;
Call-ID: a84b4c76e66710
CSeq: 63104 OPTIONS
Supported: gruu
Contact: <sip:alice@atlanta.com>;gr=urn:uuid:f81d4fae-7dec-11d0-a765-00a0c91e6bf6;+g.oma.pusheventapp="mms"
Allow: INVITE, ACK, CANCEL, OPTIONS, BYE, MESSAGE
User-Agent:
vendor="vendor.example.net";model="Z-phone";version="1.2.3"
Accept: message/external-body,application/oma_PushOptions
Content-Length: 0

---

It can be seen that the Contact header portion of this SIP OPTIONS request includes the GRUU (indicated by the "gr" parameter) of the Push Receiver Agent that sent the request. At event 120, the SIP/IP Core forwards the SIP OPTIONS request to the SIP Push Sender Agent.

At event 130, the SIP Push Sender Agent sends a SIP 200 OK containing information related to the capabilities of the SIP Push Sender Agent. The SIP 200 OK may also contain a body containing additional Push options and/or a URI from which additional Push Options might be obtained. The following is an embodiment of this SIP 200 OK response:

```
SIP/2.0 200 OK
Via: SIP/2.0/UDP
pc33.atlanta.com;branch=z9hG4bKhjhs8ass877;received=192.0.2.4
To: <sip:pushserver@network.com>;tag=93810874
From: Alice <sip:alice@atlanta.com>;tag=1928301774
Call-ID: a84b4c76e66710
CSeq: 63104 OPTIONS
Contact: <sip:pushserver@network.com>;+g.oma.pusheventapp="mms"
Allow: INVITE, ACK, CANCEL, OPTIONS, BYE, MESSAGE
Supported: gruu
Content-Type: message/external-body;
    ACCESS-TYPE=URL;
    URL="http://www.example.net/PushOptionsSupported";
    EXPIRATION=" Mon, 23 Jun 2008 12:00:00 GMT";
    size=231
Content-Length: 105
Content-Type: text/html
Content-Disposition: attachment
Content-ID: a4e55247127827d@example.net
```

At event 140, the SIP/IP Core forwards the SIP 200 OK to the SIP Push Receiver Agent. At event 150, the SIP Push Sender Agent sends the SIP/IP Core a SIP OPTIONS request containing the SIP Push Receiver Agent's public GRUU, which the SIP Push Receiver Agent provided in the previous SIP OPTIONS request. That is, the Push Sender Agent requests the capabilities of the Push Receiver Agent that has the specified GRUU. The following is an embodiment of this SIP OPTIONS request:

```
OPTIONS sip:alice@atlanta.com;gr=urn:uuid:f81d4fae-7dec-11d0-a765-00a0c91e6bf6 SIP/2.0
Via: SIP/2.0/UDP pc33.atlanta.com;branch=z9hG4bKhjhs8ass877
Max-Forwards: 70
To: <sip:alice@atlanta.com>
From: <sip:pushserver@network.com>;tag=1928301779
P-Asserted-Identity: <sip:pushserver@network.com>
Call-ID: a84b4c76e66719
CSeq: 63104 OPTIONS
Contact: <sip:pushserver@network.com>,+g.oma.pusheventapp="mms"
Allow: INVITE, ACK, CANCEL, OPTIONS, BYE, MESSAGE
Supported: gruu
Accept: message/external-body,application/Dev-cap
Content-Length: 0
```

It can be seen that the GRUU of the SIP Push Receiver Agent is included in the Request-URI portion of this SIP OPTIONS request. At event 160, the SIP/IP Core forwards the SIP OPTIONS request to the SIP Push Receiver Agent. At event 170, the SIP Push Receiver Agent sends a SIP 200 OK response containing information related to the capabilities of the SIP Push Receiver Agent to the SIP/IP Core. The SIP 200 OK response may also contain a body containing additional Push options or a URI from which additional Push Options can be obtained. The following is an embodiment of this SIP 200 OK response:

```
SIP/2.0 200 OK
Via: SIP/2.0/UDP
pc33.atlanta.com;branch=z9hG4bKhjhs8ass877;received=192.0.2.4
To: <sip:alice@atlanta.com>;tag=93810879
From: <sip:pushserver@network.com>;tag=1928301779
Call-ID: a84b4c76e66719
CSeq: 63104 OPTIONS
Supported: gruu
Contact: <sip:alice@atlanta.com>;gr=urn:uuid:f81d4fae-7dec-11d0-
    a765-00a0c91e6bf2;+g.oma.pusheventapp="mms"
Allow: INVITE, ACK, CANCEL, OPTIONS, BYE, METHOD
User-Agent:
vendor="vendor.example.net";model="Z-phone";version="1.2.3"
Content-Length: 274
Content-Type: message/external-body;
    ACCESS-TYPE="URL"
    URL="http://www.example.com/useragentprofile/07242002";
    EXPIRATION ="Mon, 23 June 2008 09:00:00 GMT";
    size=4123
Content-Type: application/Dev-cap
Content-Disposition: attachment
Content-ID: 4e5562cd1214427d@example.net
```

It can be seen that the Content-Type portion of this SIP 200 OK response includes a URL from which the capabilities of the Push Receiver Agent can be obtained. At event 180, the SIP/IP Core forwards the SIP 200 OK response to the SIP Push Sender Agent.

In another embodiment, rather than the Push Receiver Agent providing its GRUU to the Push Sender Agent in a SIP OPTIONS request, the Push Sender Agent requests the Push Receiver Agent's GRUU from the SIP/IP Core using a SIP SUBSCRIBE message. The SIP/IP Core returns the GRUU value of the Push Receiver Agent in a SIP NOTIFY message, and the Push Sender Agent then uses this GRUU to send the Push Receiver Agent a SIP OPTIONS request requesting the Push Receiver Agent's capabilities.

Figure 2:
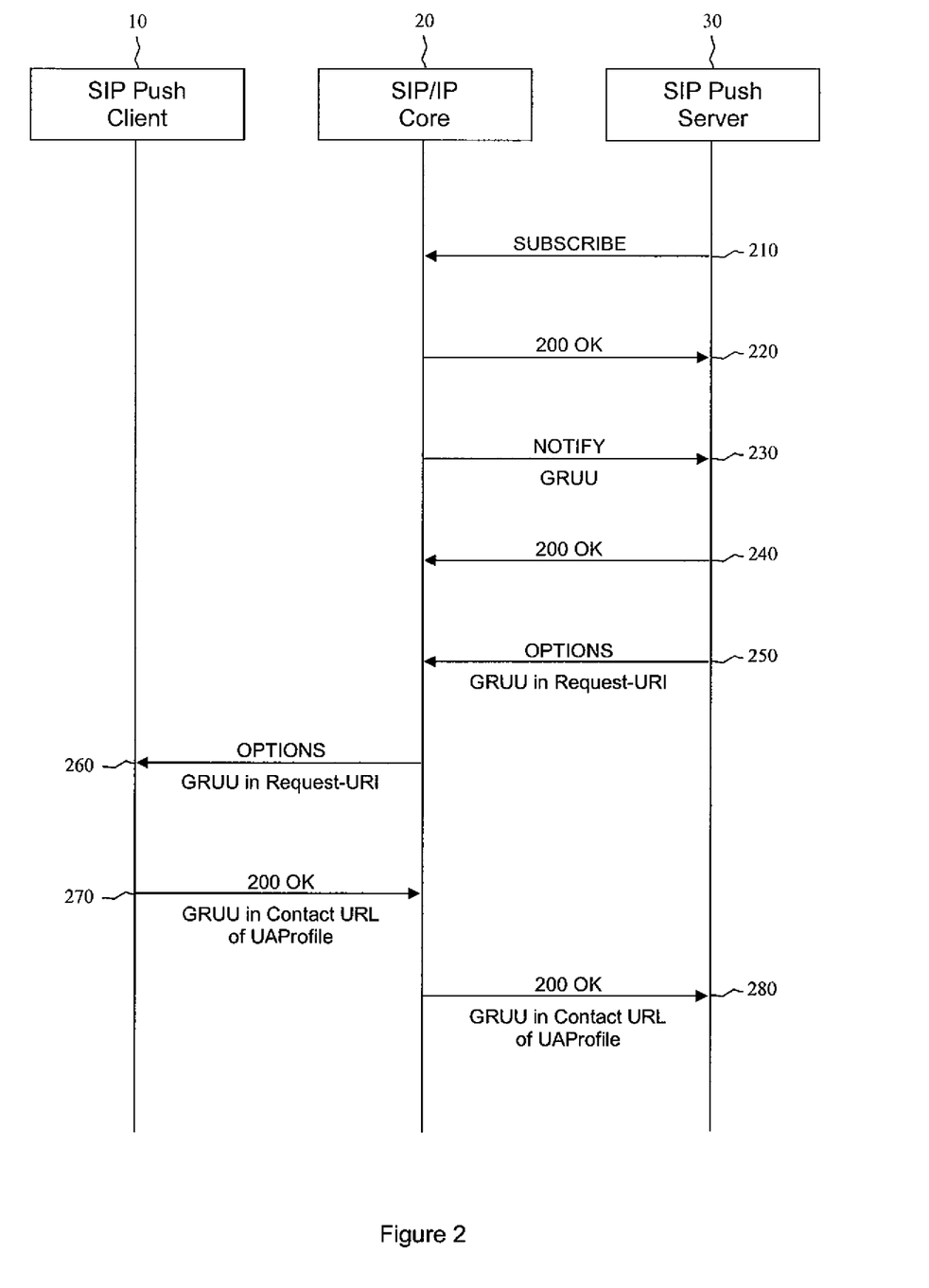
FIG. 2 is another message flow diagram according to an embodiment of the disclosure.

FIG. 2 depicts an example message flow between a SIP Push client (or SIP Push Receiver Agent) 10, a SIP/IP Core 20, and a SIP PUSH server (or SIP Push Sender Agent) 30 under this embodiment. At event 210, the SIP Push Sender Agent sends the SIP/IP Core a SIP SUBSCRIBE request. The following is an embodiment of the SIP SUBSCRIBE request:

```
SUBSCRIBE sip: sip:alice@atlanta.com SIP/2.0
Via: SIP/2.0/UDP host.network.net;branch=z9hG4bK9zz8
Max-Forwards: 70
From: <sip:pushserver@network.net>;tag=kkaz-
To: <sip:alice@atlanta.com>
Call-ID: faif9a@host.network.net
CSeq: 2 SUBSCRIBE
Event: reg
Expires: 3600
Contact: <sip:pushserver@network.net>
Content-Length: 0
```

At event 220, the SIP/IP Core receives the SIP SUBSCRIBE request and sends a SIP 200 OK response to SIP Push Sender Agent. At event 230, the SIP/IP Core sends the SIP Push Sender Agent a SIP NOTIFY containing the public GRUU value of the SIP Push Receiver Agent that was obtained during the registration process. The following is an embodiment of the SIP NOTIFY request:

```
NOTIFY sip: sip:pushserver@@network.net SIP/2.0
Via: SIP/2.0/UDP host.network.net;branch=z9hG4bK9zz8
Max-Forwards: 70
From: <sip: sipipcore@network.net>;tag=kkaa-
Request-URI: <sip:pushserver@network.net>
Call-ID: faif9a@host.network.net
CSeq: 2 NOTIFY
Event: reg
Subscription-State: active;expires=3600
Content-Type: application/reginfo+xml
Contact: <sip:sipipcore@network.net>
Content-Length:
<?xml version="1.0"?>
        <reginfo xmlns="urn:ietf:params:xml:ns:reginfo"
                 xmlns:gr="urn:ietf:params:xml:ns:gruuinfo"
                 version="1" state="full">
            <registration aor="sip:alice@atlanta.com" id="a7"
                          state="active">
                <contact id="92" state="active" event="registered"
                         duration-registered="1" expires="3599"
                         callid="faif9a@pc33.atlanta.com" cseq="23001">
                    <uri>
                        sip:alice@pc33.atlanta.com
                    </uri>
<allOneLine>
                    <unknown-param name="+sip.instance">
"<<urn:uuid:f81d4fae-7dec-11d0-a765-00a0c91e6bf6>"
</unknown-param>
</allOneLine>
<allOneLine>
                    <gr:pub-gruu uri="
sip:alice@atlanta.com;gr=urn:uuid:f81d4fae-7dec-11d0-a765-00a0c91e6bf6"/>
</allOneLine>
<allOneLine>
                    <gr:temp-gruu uri="sip:8ffkas08af7fasklzi9@atlanta.com
;gr" first-cseq="54301"/>
</allOneLine>
                </contact>
                <contact id="93" state="active" event="registered"
                         duration-registered="1" expires="3599"
                         callid="fae678@pc33.atlanta.com" cseq="23001">
                    <uri>
                        sip:alice@pc33.atlanta.com
                    </uri>
<allOneLine>
                    <unknown-param name="+sip.instance">
"<urn:uuid:fa2358-7dec-11d0-b678-00c0b27d6ac9>"
</unknown-param>
</allOneLine>
<allOneLine>
                    <gr:pub-gruu uri="
sip:alice@atlanta.com;gr=urn:uuid:fa2358-7dec-11d0-b678-00c0b27d6ac9"/>
</allOneLine>
<allOneLine>
                    <gr:temp-gruu
                         uri="sip:afas8i9708klzffkasf@atlanta.com
                         ;gr"first-cseq="54102"/>
</allOneLine>
                </contact>
            </registration>
        </reginfo>
```

At event 240, the SIP Push Sender Agent sends a SIP 200 OK to the SIP/IP Core. At event 250, the SIP Push Sender Agent sends the SIP/IP Core a SIP OPTIONS request containing, in the Request-URI, the public GRUU of the SIP Push Receiver Agent. That is, the SIP OPTIONS request is addressed to the SIP Push Receiver Agent with the specified GRUU. The following is an embodiment of the SIP OPTIONS request:

```
OPTIONS sip:alice@atlanta.com;gr=urn:uuid:f81d4fae-7dec-11d0-
    a765-00a0c91e6bf6 SIP/2.0
```

-continued

```
Via: SIP/2.0/UDP pc33.atlanta.com;branch=z9hG4bKhjhs8ass877
Max-Forwards: 70
To: <sip:alice@atlanta.com>
From: <sip:pushserver@network.com>;tag=1928301779
P-Asserted-Identity: <sip:pushserver@network.com>
Call-ID: a84b4c76e66719
CSeq: 63104 OPTIONS
Contact: <sip:pushserver@network.com>;+g.oma.pusheventapp="mms"
Allow: INVITE, ACK, CANCEL, OPTIONS, BYE, MESSAGE
Supported: gruu
Accept: message/external-body,application/Dev-cap
Content-Length: 0
```

At event 260, the SIP/IP Core forwards the SIP OPTIONS request to the SIP Push Receiver Agent with the specified GRUU. At event 270, the SIP Push Receiver Agent sends a SIP 200 OK response containing information related to the capabilities of the SIP Push Receiver Agent to the SIP/IP Core. The SIP 200 OK response may also include a body containing additional Push Options or a URI from which additional Push Options can be obtained. The following is an embodiment of the SIP 200 OK response:

```
SIP/2.0 200 OK
Via: SIP/2.0/UDP
pc33.atlanta.com;branch=z9hG4bKhjhs8ass877;received=192.0.2.4
To: <sip:alice@atlanta.com>;tag=93810879
From: <sip:pushserver@network.com>;tag=1928301779
Call-ID: a84b4c76e66719
CSeq: 63104 OPTIONS
Supported: gruu
Contact:<sip:alice@atlanta.com>;gr=urn:uuid:f81d4fae-7dec-11d0-
    a765-00a0c91e6bf2;+g.oma.pusheventapp="mms"
Allow: INVITE, ACK, CANCEL, OPTIONS, BYE, METHOD
User-Agent:
vendor="vendor.example.net";model="Z-phone";version="1.2.3"
Content-Length: 274
Content-Type: message/external-body;
    ACCESS-TYPE="URL"
    URL="http://www.example.com/useragentprofile/07242002";
    EXPIRATION ="Mon, 23 June 2008 09:00:00 GMT";
    size=4123
Content-Type: application/Dev-cap
Content-Disposition: attachment
Content-ID: 4e5562cd1214427d@example.net
```

At event 280, the SIP/IP Core forwards the SIP 200 OK response to the SIP Push Sender Agent.

In another embodiment, the SIP Push Sender Agent could obtain the GRUU using a third party registration mechanism that contains a body containing the contents of the original SIP REGISTER request. The original SIP REGISTER request may include the Contact header values from the original SIP REGISTER request sent by SIP Push Receiver Agent. The body might not directly contain a GRUU, but the Contact header of the original SIP REGISTER request might contain the sip.instance feature tag. If the SIP Push Sender Agent knows that the policy of the SIP/IP core is to derive the public GRUU from the registered PUI or AoR with the "gr" parameter of the public GRUU set equal to the value of the sip.instance feature tag in the Contact header of the original SIP REGISTER request, then the SIP Push Sender Agent can also derive the GRUU of the SIP Push Receiver Agent that just registered.

Figure 3:
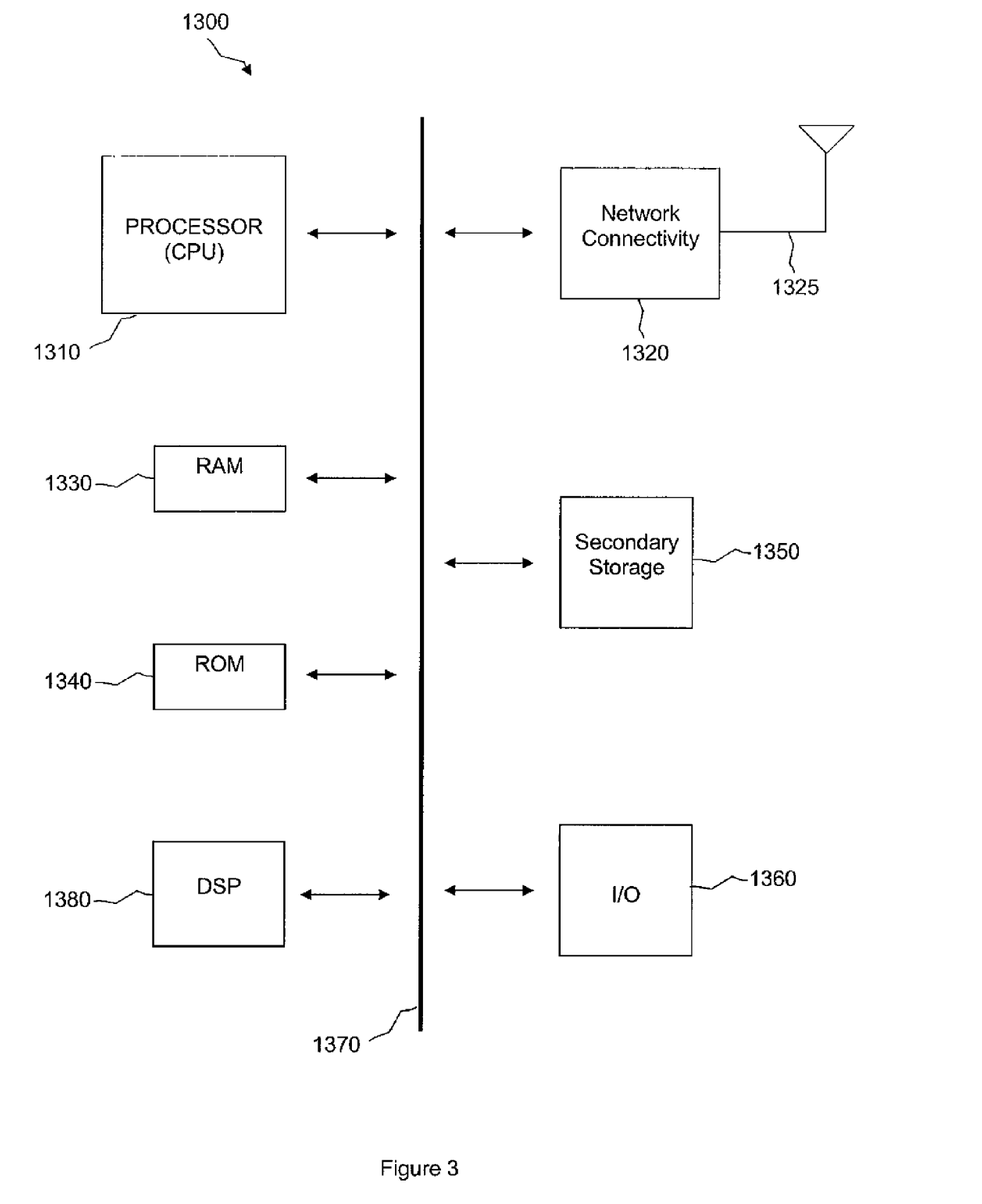
FIG. 3 illustrates a processor and related components suitable for implementing the several embodiments of the present disclosure.

The components described above might include a processing component that is capable of executing instructions related to the actions described above. FIG. 3 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an embodiment, a method is provided for delivering the capabilities of user agents. The method includes a user agent sending a SIP message containing a Contact Header containing a Push Resource Identifier feature tag containing at least one push resource.

In an alternative embodiment, a SIP push receiver agent is provided. The push receiver agent includes a component configured such that the push receiver agent sends a SIP message containing a Contact Header containing a Push Resource Identifier feature tag containing at least one push resource.

In an alternative embodiment, a SIP push sender agent is provided. The push sender agent includes a component configured such that the push sender agent receives a SIP message containing a Contact Header containing a Push Resource Identifier feature tag containing at least one push resource.

The following 3rd Generation Partnership Project (3GPP) Technical Specifications (TS), and Internet Engineering Task Force (IETF) Requests For Comments (RFC) are incorporated herein by reference: [RFC 3261] Session Initiation Protocol, [RFC 3265] Session Initiation Protocol (SIP)-Specific Event Notification, [RFC 3680] Registration Event Package, [draft-ietf-sip-gruu] Obtaining and Using Globally Routable User Agent (UA) URIs (GRUU) in the Session Initiation Protocol (SIP), [draft-ieff-sipping-gruu-reg-event] GRUU registration events, OMA-TS-SIP_Push-V1_0-20080416-D, 3GPP TS 23.218, and 3GPP TS 24.229.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method comprising:
   generating a session initiation protocol 'SIP' OPTIONS message at a push receiver agent, the SIP OPTIONS message configured to deliver the push receiver agent's capability to a push sender agent;
   including a contact header in the SIP OPTIONS message, the contact header including a push resource identifier feature tag containing a value of a push resource supported by the push receiver agent;
   including an allow header in the SIP OPTIONS message, the allow header including SIP methods supported by the push receiver agent;
   sending the SIP OPTIONS message that includes: a) the contact header with the push resource identifier feature tag containing the value of the push resource supported by the push receiver agent; and b) the allow header with the SIP methods supported by the push receiver agent to provide the push receiver agent's capability to the push sender agent; and
   receiving, relative to sending the SIP OPTIONS message, a SIP 200 OK response that includes: a) a contact header including a push resource identifier feature tag containing a value of a push resource supported by the push receiver agent which was specified in the SIP OPTIONS message; and b) an allow header containing SIP methods that the push sender agent supports.

2. The method of claim 1 wherein the contact header of the SIP OPTIONS message further includes a uniform resource identifier 'URI' identifying the push receiver agent.

3. The method of claim 2 wherein the URI is a globally routable user agent 'UA' URI 'GRUU'.

4. The method of claim 1 wherein the SIP methods supported by the push receiver agent include at least one of INVITE, ACK, CANCEL, OPTIONS, BYE and MESSAGE.

5. The method of claim 1 further comprising:
   including a user agent header in the SIP OPTIONS message, the user agent header containing at least one of a model, vendor and version of the push receiver agent.

6. A non-transitory computer-readable medium containing instructions which, when executed by a processor, are configured to cause performance of the method of claim 1.

7. A device comprising:
   a processor configured to execute a push receiver agent for:
      generating a session initiation protocol 'SIP' OPTIONS message configured to deliver the push receiver agent's capability to a push sender agent;
      including a contact header in the SIP OPTIONS message, the contact header including a push resource identifier feature tag containing a value of a push resource supported by the push receiver agent; and
      including an allow header in the SIP OPTIONS message, the allow header including SIP methods supported by the push receiver agent; and
   a communication portion configured for:
      sending the SIP OPTIONS message that includes: a) the contact header with the push resource identifier feature tag containing the value of the push resource supported by the push receiver agent; and b) the allow header with the SIP methods supported by the push receiver agent to provide the push receiver agent's capability to the push sender agent; and
      receiving, relative to sending the SIP OPTIONS message, a SIP 200 OK response that includes: a) a contact header including a push resource identifier feature tag containing a value of a push resource supported by the push receiver agent which was specified in the SIP OPTIONS message; and b) an allow header containing SIP methods that the push sender agent supports.

8. The device of claim 7 wherein the contact header of the SIP OPTIONS message further includes a uniform resource identifier 'URI' identifying the push receiver agent.

9. The device of claim 8 wherein the URI is a globally routable user agent 'UA' URI 'GRUU'.

10. The device of claim 7 wherein the SIP methods supported by the push receiver agent include at least one of INVITE, ACK, CANCEL, OPTIONS, BYE and MESSAGE.

11. The device of claim 7 wherein the processor is configured to execute a push receiver agent for further including a user agent header in the SIP OPTIONS message, the user agent header containing at least one of a model, vendor and version of the push receiver agent.

12. A method comprising:
   receiving, at a push sender agent, a SIP OPTIONS request configured to deliver a push receiver agent's capability to the push sender agent, the SIP OPTIONS request including: a) a contact header with a push resource identifier feature tag containing a value of a push resource supported by a push receiver agent; and b) an allow header with SIP methods supported by the push receiver agent;
   generating, at the push sender agent, a SIP 200 OK message in response to the SIP OPTIONS request;

including a contact header in the SIP 200 OK message, the contact header including a push resource identifier feature tag containing a value of a push resource supported by the push receiver agent which was specified in the SIP OPTIONS request; and including an allow header in the SIP 200 OK message, the allow header containing SIP methods that the push sender agent supports.

13. The method of claim 12 further comprising:

including an accept header in the SIP 200 OK message, the accept header containing a MIME type supported by the push sender agent.

14. The method of claim 13 wherein the MIME type supported by the push sender agent is "message/external-body".

15. The method of claim 12 further comprising sending the SIP 200 OK message after the including operations.

16. A non-transitory computer-readable medium containing instructions which, when executed by a processor, are configured to cause performance of the method of claim 12.

17. A device comprising:

a processor configured to execute a push sender agent; and a communication portion configured for receiving a SIP OPTIONS request configured to deliver a push receiver agent's capability to the push sender agent, the SIP OPTIONS request including: a) a contact header with a push resource identifier feature tag containing a value of a push resource supported by the push receiver agent; and b) an allow header with SIP methods supported by the push receiver agent to provide the push receiver agent's capability to the push sender agent;

the processor being configured to execute the push sender agent for:

generating a SIP 200 OK message in response to the SIP OPTIONS request;

including a contact header in the SIP 200 OK message, the contact header including a push resource identifier feature tag containing a value of a push resource supported by the push receiver agent which was specified in the SIP OPTIONS request; and including an allow header in the SIP 200 OK message, the allow header containing SIP methods that the push sender agent supports.

18. The device of claim 17 wherein the processor is configured to execute the push sender agent for further including an accept header in the SIP 200 OK message, the accept header containing a MIME type supported by the push sender agent.

19. The device of claim 18 wherein the MIME type supported by the push sender agent is "message/external-body".

20. The device of claim 17 wherein the communication portion is further configured for sending the SIP 200 OK message after the including operations.

* * * * *